United States Patent Office 3,381,206
Patented Apr. 30, 1968

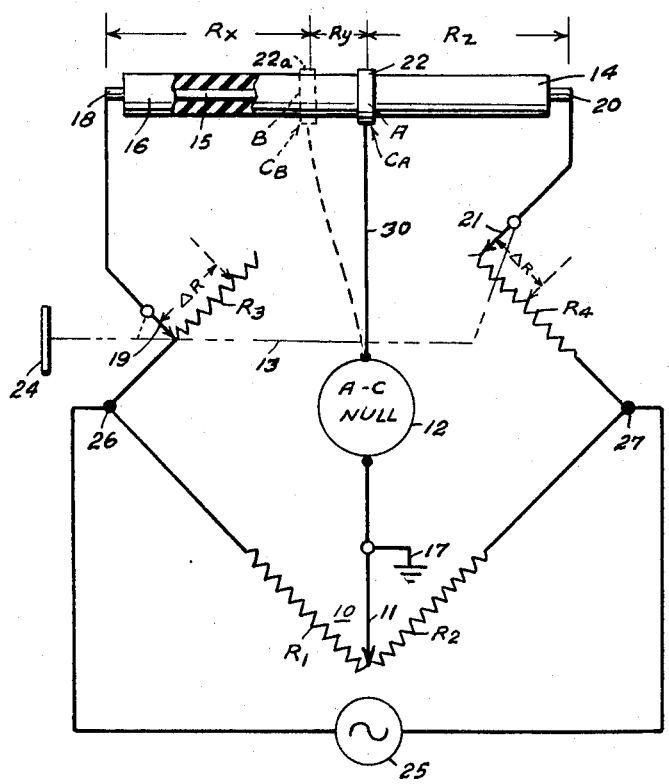

3,381,206
METHOD AND APPARATUS FOR MEASUREMENT OF INCREMENTAL RESISTANCES WITH CAPACITIVELY COUPLED PROBE MEANS
Dennis E. Gunderson, Lorton, Va., assignor to the United States of America as represented by the Secretary of the Army
Filed Oct. 18, 1965, Ser. No. 497,564
4 Claims. (Cl. 324—62)

The invention described herein may be manufactured and used by or for the Government for governmental purposes, without the payment to me of any royalty thereon.

This invention relates to resistance measurement and more particularly to a method and apparatus for determining the resistance uniformity of high voltage ignition cable and the like.

Resistor-type automotive spark plug wires have a conductive medium of powdered carbon which is subject to wide variations in uniformity from point to point. To detect sections of high resistance or low resistance along a conductor, it is necessary to be able to accurately measure the resistance of any small portion of the cable without disturbing the insulation thereof or damaging the cable in any way.

It would appear that the problem could be directly solved by passing a known alternating current through the cable and measuring the voltage drop over an area of interest by means of one or two probles, capacitively coupled to the conductor. Unfortunately there is a serious difficulty in this method; the value of the conductor-to-probe capacitance varies as the probe is moved along the cable. The sensitivity of the voltage-indicating circuit is a function of this capacitance and varies accordingly.

In the method wherein two probes and a differential input voltmeter are employed to obtain a voltage difference between two points along the cable, the variation in conductor-to-probe capacitance causes a phase difference between the input voltages which seriously complicates the direct comparison of the magnitudes of the voltages.

An object of the invention is a resistance measuring circuit for measuring increments of a resistor-type cable without making electrical contact with the portion of the conductive element thereof to be measured.

Another object of the invention is a new and novel circuit means including an electrical bridge for accurately measuring the resistance of a small increment of a long resistor-type cable wherein the accuracy of the reading is independent of coupling capacitance and of measurement of absolute voltage levels and differences.

Another object of the invention is a bridge type resistance measuring device employing a capacitance probe for measuring small increments of a resistor-type cable without compensation for the effect of variation in coupling capacitance.

Another object of the invention is an A.C. bridge for accurately measuring the resistance of small increments of resistor-type cable without making electrical contact with the portion of the conductor thereof to be measured and wherein the accuracy of the measurement is independent of the total cable resistance and the magnitude and frequency of the signal voltage.

The invention will be more fully understood and its objects and advantages further appreciated by referring now to the following detailed specification taken in conjunction with the drawing in which the single figure is a schematic circuit diagram of the invention.

Referring now to the drawing, the potentiometer 10 forms two arms $R_1$ and $R_2$ of the bridge circuit with its rotating arm 11 connected to one terminal of the A.C. null indicator 12. If the rotating arm 11 is grounded as at 17, the null indicator may be any single-ended A.C. voltage sensor having a high impedance, low capacitance input. The other two arms of the bridge are formed in part by variable resistors $R_3$ and $R_4$ which are coupled by a common shaft 13 in a manner such that when they are rotated by shaft 13 one of the variable resistors will increase in resistance and the other will decrease in resistance. A dial 24 calibrated in ohms is connected to shaft 13. Reference numeral 14 indicates a length of resistor-type automotive spark plug wire consisting of a conductive medium of powdered carbon 15 which is subject to wide variations in uniformity from point to point, and its insulation covering 16. One end 18 of the cable is connected to the movable arm 19 of variable resistor $R_3$ and the other end 20 of the cable is connected to the movable arm 21 of variable resistor $R_4$ thereby completing the said other two arms. A metallic probe 22 which encircles the cable 14 forms a capacitance $C_A$ with the conductive medium 15 and is connected to the other terminal of the null indicator 12. The resistance of the conductive medium 15 of cable 14 is represented, as shown in the drawing, by $R_x+R_y+R_z$ where $R_y$ is the portion to be measured. An A.C. signal generator is coupled to the bridge as indicated by reference numerals 26 and 27.

In operation of the device, for example, if we desire to measure the resistance of the conductive medium 15 between points A and B, as indicated in the drawing, two steps are involved as follows: In Step 1, probe 22 is placed around the cable at position A and the ganged variable resistors $R_3$ and $R_4$ set at zero on the calibrated scale of dial 24, that is, the resistance of $R_3$ will be out of the circuit and the resistance of $R_4$ will be fully in the circuit. The potentiometer 11 is then adjusted until the A.C. null indicator 12 indicates that point position A has been brought to ground potential. In Step 2, the probe 22 is moved to point B, and the ganged resistors $R_3$ and $R_4$ are adjusted until the A.C. null indicator 12 indicates that the ground potential point has been shifted to point B. If desired, two probes may be employed, that is, probe 22 at position A and probe 22a at position B. In this case lead 30 of the A.C. null indicator is simply switched from one probe to the other by any well known switching means.

The following analysis of the two conditions of balance shows that the change in resistance of the variable resistors $R_3$ and $R_4$ indicated on the calibrated dial 24 is exactly the resistance of the conductive medium of the cable between points A and B or any other selected segment of the cable:

In Step 1

$$\frac{R_1}{R_2}=\frac{R_x+R_y}{R_z+R_4} \quad (1)$$

In Step 2

$$\frac{R_1}{R_2}=\frac{R_x+\Delta R}{R_y+R_z+R_4-\Delta R} \quad (2)$$

$$\therefore \frac{R_x+R_y}{R_z+R_4}=\frac{R_x+\Delta R}{R_y+R_z+R_4-\Delta R} \quad (3)$$

Let:

$$R_T=R_x+R_y+R_z+R_4=(R_x+\Delta R)+R_y+R_z+R_4-\Delta R$$

Then:

$$R_z+R_4=R_T-(R_x+R_y)$$

and $$R_y+R_z+R_4-\Delta R=R_T-(R_x+\Delta R)$$

Substituting in Equation 3:

$$\frac{(R_x+R_y)}{R_T-(R_x+R_y)} = \frac{(R_x+\Delta R)}{R_T-(R_x+\Delta R)}$$

Then:
$$R_x+R_y = R_x+\Delta R$$
and
$$R_y = \Delta R$$

Thus it can be seen that the resistance, $R_y$ of the conductive medium 15 of cable 14 is equal to the change in resistance, $\Delta R$, of the coupled variable resistors $R_3$ and $R_4$. $\Delta R$ being directly read from the calibrated scale on dial 24.

Although a specific embodiment of the invention has been illustrated and described, it will be understood that this is but illustrated and that various modifications may be made therein without departing from the spirit of the invention and the scope of the appended claims.

I claim:

1. In a system for contactless resistance measurement of an electric cable having a conducting medium surrounded by insulating material comprising in combination a resistance element provided with a movable contact capable of dividing the resistance element to form a pair of resistance arms of an electrical bridge, a pair of variable resistors ganged for equal but opposite resistance variations and having said conducting medium connected in series with said variable resistors through the movable arms thereof forming the other pair of arms of said bridge, means to form a junction of said pairs of arms to complete the loop for said bridge, means for applying an A.C. potential across the balancing arms of the bridge circuit, a first means forming a capacitor with said conductive medium, a second means spaced from said first means and forming a capacitor with said conductive medium, an A.C. null indicator provided with two terminals, one of said terminals connected to said movable contact and the other of said terminals switchable between said first and second means.

2. The invention in accordance with claim 1 wherein said first and second means each comprise a narrow metal band encircling the insulation material.

3. The invention in accordance with claim 2 wherein said movable contact is grounded and said A.C. null indicator comprises a single-ended A.C. voltage sensor having a high impedance, low capacitance input.

4. A method of contactless measuring incremental resistance of a cable having a conductive medium encased in an insulating material comprising the steps of placing a first metallic ring and a second metallic ring around said insulation material in spaced relationship, connecting the resistance element of a potentiometer in series with the resistance elements of a two ganged variable resistor and connecting said conductive medium in series with the rotating arms of said variable resistors to form an electrical bridge circuit, applying an A.C. signal across one diagonal of said bridge, connecting an A.C. null indicator between the rotating arm of said potentiometer and said first metallic ring, balancing said bridge circuit by means of said potentiometer while one of said variable resistors is at zero ohms and the other at maximum ohms reading, switching said A.C. null indicator to said second metallic ring, and balancing said bridge circuit by means of said two ganged variable resistor and noting the change in resistance thereof, said change of resistance being equal to the value of the resistance of said conductive means extending from said first to said second metallic rings.

References Cited

UNITED STATES PATENTS

| | | | |
|---|---|---|---|
| 754,402 | 3/1904 | Wiseman | 324—52 |
| 2,120,391 | 6/1938 | Butterfield | 324—52 |
| 2,832,042 | 4/1958 | Lambert | 324—62 XR |
| 3,287,637 | 11/1966 | Keller | 324—62 |

FOREIGN PATENTS

| | | |
|---|---|---|
| 877,642 | 5/1953 | Germany. |
| 122,811 | | U.S.S.R. |

OTHER REFERENCES

Kaufhold, German Printed Application No. 1,082,743, pub. June 2, 1960, Class 324–65.

RUDOLPH V. ROLINEC, *Primary Examiner.*

E. E. KUBASIEWICZ, *Assistant Examiner.*